US010882968B2

(12) United States Patent
Lin

(10) Patent No.: US 10,882,968 B2
(45) Date of Patent: Jan. 5, 2021

(54) POLYPROPYLENE FOAMS AND PROCESSES OF MAKING

(71) Applicant: LCY Chemical Corp., Kaohsiung (TW)

(72) Inventor: Chiang Hsiang Lin, Tainan (TW)

(73) Assignee: LCY CHEMICAL CORPORATION, Kaohsiung (TW)

( * ) Notice: Subject to any disclaimer, the term of this patent is extended or adjusted under 35 U.S.C. 154(b) by 0 days.

(21) Appl. No.: 15/583,611

(22) Filed: May 1, 2017

(65) Prior Publication Data

US 2018/0057651 A1 Mar. 1, 2018

Related U.S. Application Data

(60) Provisional application No. 62/381,565, filed on Aug. 30, 2016.

(51) Int. Cl.
| | | |
|---|---|---|
| *C08J 9/00* | (2006.01) | |
| *C08K 5/00* | (2006.01) | |
| *C08K 5/098* | (2006.01) | |
| *C08K 5/20* | (2006.01) | |
| *C08L 23/10* | (2006.01) | |
| *C08L 23/12* | (2006.01) | |
| *C08J 9/12* | (2006.01) | |

(52) U.S. Cl.
CPC ........... *C08J 9/0023* (2013.01); *C08J 9/0028* (2013.01); *C08J 9/0052* (2013.01); *C08J 9/0066* (2013.01); *C08J 9/0095* (2013.01); *C08J 9/122* (2013.01); *C08L 23/10* (2013.01); *C08L 23/12* (2013.01); *C08J 2201/03* (2013.01); *C08J 2203/06* (2013.01); *C08J 2205/044* (2013.01); *C08J 2323/12* (2013.01); *C08J 2323/14* (2013.01)

(58) Field of Classification Search
CPC .. C08J 9/0095; C08J 2323/12; C08J 2323/14; C08K 5/0083; C08L 23/10; C08L 23/12
See application file for complete search history.

(56) References Cited

U.S. PATENT DOCUMENTS

| | | | |
|---|---|---|---|
| 5,716,998 A | 2/1998 | Munakata et al. | |
| 6,204,348 B1 * | 3/2001 | Raetzsch | C08F 255/02 524/572 |
| 9,216,525 B2 | 12/2015 | Yoshida et al. | |
| 2003/0186039 A1 | 10/2003 | Hanada et al. | |
| 2005/0277720 A1 | 12/2005 | Ek et al. | |
| 2011/0021650 A1 * | 1/2011 | Itadani | B29C 47/0021 521/79 |
| 2011/0200775 A1 | 8/2011 | Bernreitner et al. | |
| 2012/0029123 A1 | 2/2012 | Yamamoto et al. | |
| 2012/0094065 A1 | 4/2012 | Shelton | |
| 2014/0088214 A1 | 3/2014 | Okamoto et al. | |
| 2014/0167314 A1 | 6/2014 | Contrada et al. | |
| 2016/0009887 A1 | 1/2016 | Fukuzawa | |
| 2016/0122505 A1 | 5/2016 | Vandewiele et al. | |
| 2018/0094111 A1 * | 4/2018 | Lin | B29C 47/00 |

FOREIGN PATENT DOCUMENTS

| | | |
|---|---|---|
| CN | 1861368 A | 11/2006 |
| CN | 101379129 A | 3/2009 |
| CN | 101379129 A | 4/2009 |
| CN | 101538387 A | 9/2009 |
| CN | 101812201 A | 8/2010 |
| CN | 102040772 A | 5/2011 |
| CN | 102295807 A | 12/2011 |
| CN | 102391571 B | 4/2013 |
| CN | 103547443 A | 1/2014 |
| CN | 104031316 A | 9/2014 |
| CN | 104250384 A | 12/2014 |
| CN | 104250400 A | 12/2014 |
| CN | 104250401 A | 12/2014 |
| CN | 104341680 A | 2/2015 |
| CN | 104448541 A | 3/2015 |
| CN | 104558821 A * | 4/2015 |
| CN | 104558821 A | 4/2015 |
| CN | 105153556 A | 12/2015 |
| CN | 105385032 A | 3/2016 |
| EP | 0 177 961 A2 | 4/1986 |
| EP | 1 323 779 A1 | 7/2003 |
| EP | 1 479 716 A1 | 11/2004 |
| EP | 1 676 874 A1 | 12/2005 |
| EP | 1 816 158 A1 | 2/2006 |
| EP | 2 826 812 A1 | 1/2015 |
| EP | 2 826 813 A1 | 1/2015 |
| JP | H0711041 | 1/1995 |
| JP | H 08183873 | 7/1996 |
| JP | H 08183873 A | 7/1996 |
| JP | H 09156053 | 6/1997 |

(Continued)

OTHER PUBLICATIONS

Machine translation of CN-104558821-A obtained from the European Patent Office on Aug. 5, 2019.*

(Continued)

*Primary Examiner* — Melissa A Rioja
(74) *Attorney, Agent, or Firm* — Bacon & Thomas, PLLC

(57) ABSTRACT

The present disclosure provides a linear polypropylene foam with, for example, low density and/or high expansion ratio, said linear polypropylene foam comprising at least one polypropylene, at least one alpha nucleating agent, and at least one beta nucleating agent. The present disclosure also provides compositions and processes for making said linear polypropylene foam.

19 Claims, 6 Drawing Sheets

(56) References Cited

FOREIGN PATENT DOCUMENTS

| | | |
|---|---|---|
| JP | H 1060148 | 3/1998 |
| JP | 2003-313348 | 11/2003 |
| JP | 2008-120931 | 5/2006 |
| JP | 2008-255191 | 10/2008 |
| JP | 2009-221473 | 10/2009 |
| JP | 2011-051180 | 3/2011 |
| JP | 2014-118453 | 6/2014 |
| KR | 20080091474 | 10/2008 |
| WO | WO 2007/090519 | 8/2007 |
| WO | WO 2010/037747 A1 | 4/2010 |
| WO | WO 2014/205624 A1 | 12/2014 |
| WO | WO 2014/206437 A1 | 12/2014 |
| WO | WO 2016/102465 A1 | 6/2016 |

OTHER PUBLICATIONS

Machine translation of JPH08183873 to Okimura et al. obtained from the European Patent Office in Jan. 2020.*
English language abstract of JPH08183873 to Okimura et al. obtained from the European Patent Office in Jan. 2020.*
Office Action from the Taiwan Intellectual Property Office in related application No. 106125572, dated May 7, 2018.
Machine Translation of CN 101538387 A.
Machine Translation of CN 101812201 A.
Machine Translation of CN 102040772 A.
Machine Translation of CN 102295807 A.
Machine Translation of CN 104031316 A.
Machine Translation of CN 104250384 A.
Machine Translation of CN 104250400 A.
Machine Translation of CN 104250401 A.
Machine Translation of CN 104341680 A.
Machine Translation of CN 104448541 A.
Machine Translation of CN 104558821 A.
Machine Translation of CN 105153556 A.
Machine Translation of CN 105385032 A.
Machine Translation of EP 0 177 961 A2.
Machine Translation of JP 2003-313348.
Machine Translation of JP 2008-120931.
Machine Translation of JP 2008-255191.
Machine Translation of JP 2009-221473.
Machine Translation of JP 2011-051180.
Machine Translation of JP 2014-118453.
Machine Translation of JPH 1060148.
Machine Translation of JPH 08183873.
Machine Translation of JPH 09156053.
Office Action from the Korean Intellectual Property Office in related application No. 10-2017-0103683, dated Dec. 6, 2018.
Office Action from the Japanese Intellectual Property Office in related application No. 164329, dated Jun. 5, 2018.
Machine Translation of CN 102391571 B.
European Search Report for counterpart application No. EP 17187794.7-1377, dated Dec. 15, 2017 (7 pages).
Office Action from the Chinese National Intellectual Property Administration in related application No. 201710675684.9, dated Jul. 1, 2019.
Notice to Grant EP Patent, European Communication under Article 97(1) EPC for counterpart EP Application No. 17 187 794.7-1107, dated Apr. 17, 2020.
Notice to Grant EP Patent, European Communication under Rule 71(3) EPC for counterpart EP Application No. 17 187 794.7-1107, dated Jan. 15, 2020.

* cited by examiner

Fig. 3B Comparative example 1-3

Fig. 3A Comparative example 1-2

Fig. 3C Example 1-2

Figure 4
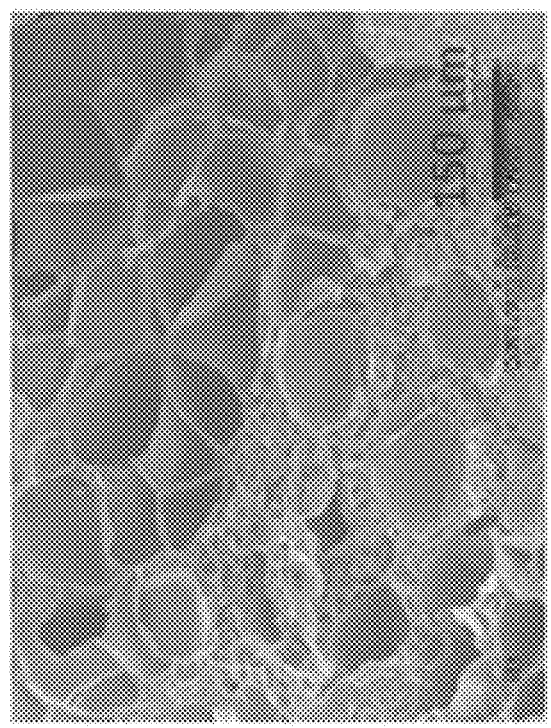
Fig 4A
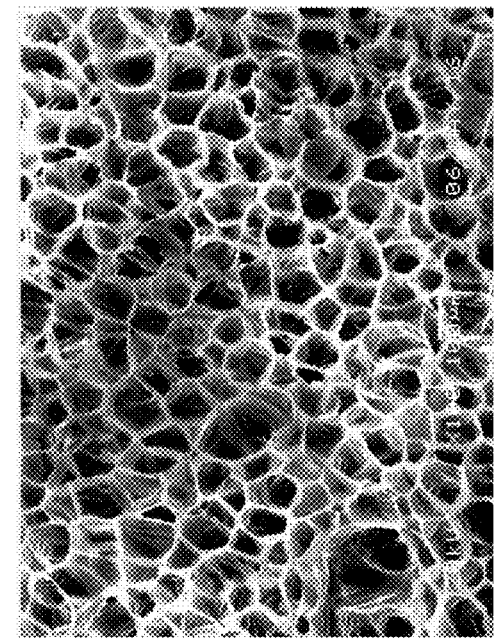
Fig 4B
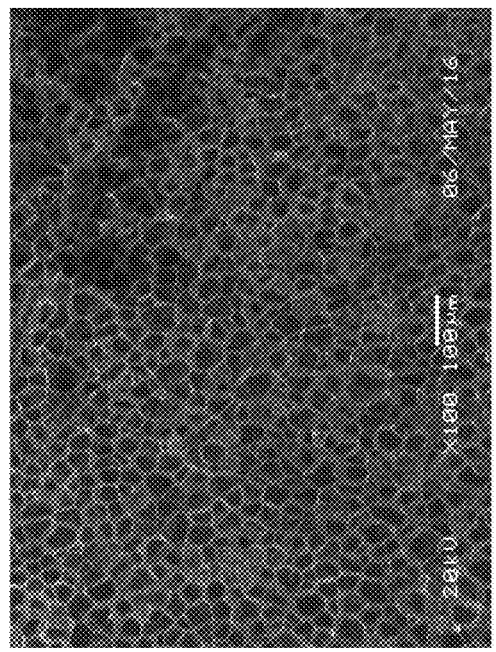
Fig 4C

POLYPROPYLENE FOAMS AND PROCESSES OF MAKING This application claims priority to U.S. provisional application No. 62/381,565, filed on Aug. 30, 2016, which is herein incorporated by reference in its entirety.

Polymeric foam, in general, comprises at least two phases: (1) a polymer matrix providing structure and support and (2) gaseous voids or bubbles (also referred to as "cells"). Due to its gaseous phase, polymeric foams have low thermal conductivity and good thermal insulative properties. Typical applications of polymeric foams include drink foam cups, food containers or trays, packaging, insulation, automotive, sports, and medical applications.

Process for making polymeric foam generally includes steps of introducing gas bubbles into a polymer-based formulation, allowing the bubbles to grow and stabilize, and then solidifying the bubble-containing polymer structure. Polystyrene (PS) foams are the earliest and most developed kind of polymeric foam, while other polymeric foams have also been developed and used. Typical PS foams, however, cannot be recycled and are therefore disfavored for environmental and cost reasons.

Unlike PS, polypropylene (PP) has the potential for recycling and thus would be advantageous for use in foam products, especially for use in disposable products. However, it is believed that linear polypropylene, because of its low melt strength, would lead to polymeric foam with open cells structure and/or poor cell integrity or mechanical properties. See EP 1 479 716. In contrast, high melt strength polypropylene (HMS-PP), which are long-chain branched polypropylene (i.e., containing long side arms coming off the backbone), has been successfully used to produce low density polymeric foam. Specifically, the addition of HMS-PP leads to a better balance of the rate of crystallization and the rate of bubble growth. As such, low density polymeric foam with uniform and controlled cellular structure has been produced with the combination of linear polypropylene and HMS-PP, provided that as much HMS PP as possible is included. See EP 1 479 716. The manufacturing cost associated with HMS-PP, however, remains relatively high, making the HMS-PP foams less market competitive than polystyrene foams.

Contrary to conventional wisdom that linear PP are not suitable for forming foams without the inclusion of HMS-PP, the inventor of the present disclosure surprisingly discovered that the morphology of foam prepared using linear polypropylene can be improved by using a combination of alpha and beta nucleating agents, and, according to certain embodiments, polymeric foams prepared from linear polypropylene can have properties comparable to or better than polymeric foams made from HMS-PP. Thus, according to certain embodiments, HMS-PP is not needed or used to make PP foams with useful structures and physical properties.

For example, according to certain embodiments, the compositions and processes disclosed in the present disclosure can be used to provide linear polypropylene foams having, for example, low density and/or high expansion ratio.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate exemplary embodiments of the disclosure and together with the description, serve to explain the principles of certain embodiments.

BRIEF DESCRIPTION OF THE DRAWINGS

FIG. 4, A-C, show SEM images of polypropylene foam samples produced according to an exemplary batch process disclosed in Example 2.

DESCRIPTION OF THE EMBODIMENTS

Figure 1:
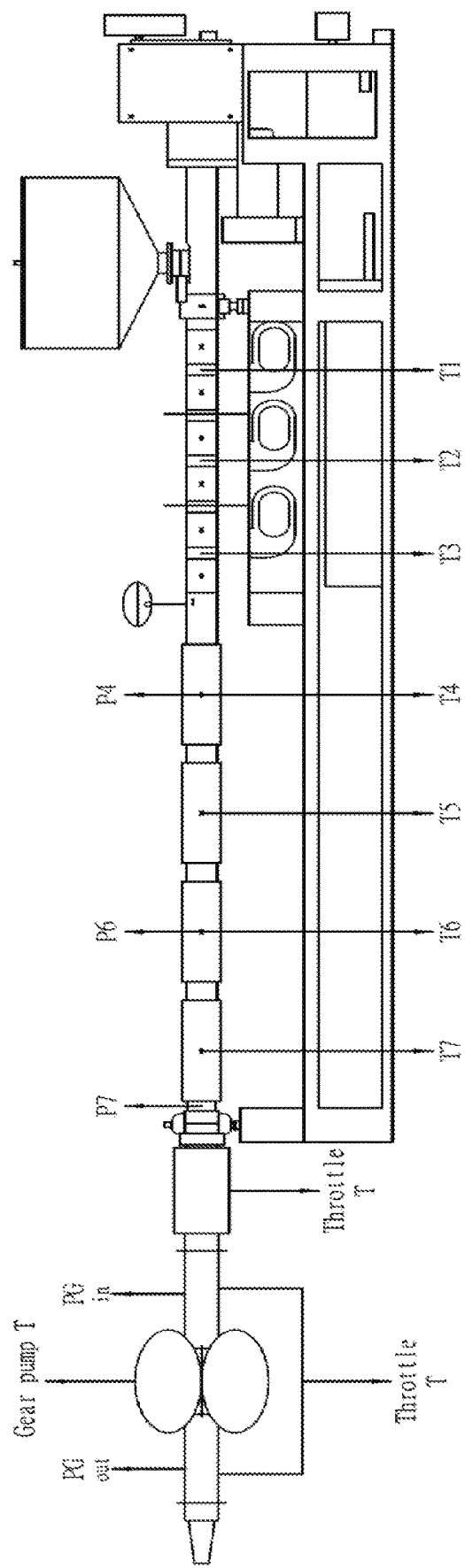
FIG. 1 shows a non-limiting, exemplary system for making a linear polypropylene foam with a continuous process. Each of T1-T7 represents the temperature at heat zones 1-7 respectively, and P4, P6, and P7 represent the pressure at heat zones 4, 6, and 7 respectively. $PG_{in}$ and $PG_{out}$ are the pressures at the inlet and outlet of the gear pump respectively. T is the temperature within the gear pump.

The term "linear polypropylene" refers to: (i) homopolymers of propylene (as non-limiting examples, Globalene® PC366-3 supplied by LCY Chemical Corp.); (ii) random copolymer of propylene and at least one co-monomer chosen from ethylene and butene (as non-limiting examples, Globalene® 8001 or Globalene® ST611 or ST925 supplied by LCY Chemical Corp.); (iii) heterophasic (impact) copolymer comprising ethylene propylene rubber (EPR) dispersed within polypropylene homopolymer matrix (as non-limiting examples, Globalene® 7633, 7633U, or 7633-3 supplied by LCY Chemical Corp.); and (iv) any combinations of (i)-(iii).

The term "linear polypropylene foam" refers to polymeric foam comprising less than 5%, such as less than 4%, 3%, 2%, 1%, or 0.5%, relative to the total weight of the polymers, of high melt strength polypropylene (HMS-PP). In some embodiments, liner polypropylene foam does not contain any HMS-PP.

At room temperature, polypropylene is a semi-crystalline material containing amorphous and ordered crystalline regions. Depending on the crystallization conditions, polypropylene can crystallize into several crystalline forms. The most thermodynamically stable is the α or monoclinic form. Another crystalline form of polypropylene, the β or hexagonal form, can be obtained via temperature gradient crystallization, crystallization in shear field, or by the use of nucleating agents that preferentially crystalize the β from.

Nucleating agents are organic or inorganic substances, when added, may provide one or more functions such as increasing the crystallization rate, providing a higher degree of crystallinity, resulting in a more uniform crystalline structure, and/or improving mechanical properties. As used herein, alpha (α) nucleating agent are organic or inorganic substances, when added, may increase the crystallization rate of α crystal and/or lead to a higher degree of a crystallinity. As used herein, beta (β) nucleating agent are organic or inorganic substances, when added, may increase the crystallization rate of β crystal and/or lead to a higher degree of β crystallinity.

Compositions for Preparing a Linear Polypropylene Foam

The present disclosure provides a composition suitable for preparing a linear polypropylene foam, said composition comprising at least one linear polypropylene, at least one alpha (α) nucleating agent, and at least one beta (β) nucleating agent.

In some embodiments, the at least one linear polypropylene is present in an amount of at least 80%, such as 85%, 90%, 95%, or 98% by weight of the composition.

In some embodiments, the composition suitable for preparing a linear polypropylene foam has a melt flow rate (MFR) ranging from 1 g/10 min to 20 g/10 min.

In some embodiments, the composition suitable for preparing a linear polypropylene foam has a MFR ranging from 1 g/10 min to 5 g/10 min. As non-limiting examples, the composition may have a MFR ranging from 1.5 g/10 min to 4.5 g/10 min, such as from 2 g/10 min to 4 g/10 min, or 2.5 g/10 min to 3.5 g/10 min.

In some embodiments, the composition suitable for preparing a linear polypropylene foam has a MFR ranging from 5 g/10 min to 20 g/10 min. As non-limiting examples, the composition may have a MFR ranging from 5 g/10 min to 18 g/10 min, such as from 5 g/10 min to 15 g/10 min, or 5 g/10 min to 10 g/10 min.

MFR is an indirect measure of molecular weight, with high MFR corresponding to low molecular weight. Additional information regarding the test conditions for measuring MFR can be found in ASTM D1238, which provides that the standard conditions for measuring the MFR of polypropylene compositions is under a load of 2.16 kg and at 230° C.

In some embodiments, the composition has an Izod impact strength, as measured according to ASTM D256 (at 23° C., notched), of no less than 8 kg-cm/cm. For example, in some embodiments, the composition has an Izod impact strength ranging from 8 to 50 kg-cm/cm, such as from 8 kg-cm/cm to 40 kg-cm/cm, 8 kg-cm/cm to 30 kg-cm/cm, 8 kg-cm/cm to 25 kg-cm/cm, or 8 kg-cm/cm to 20 kg-cm/cm.

In some embodiments, the at least one linear polypropylene is chosen from homopolymers of propylene. As non-limiting examples, the homopolymers of propylene may have a weight average molecular weight ranging from 300,000 to 420,000. Further as non-limiting examples of homopolymers of propylene: Globalene® PT100, PC366-3, PT101N, PD402, 6524, PC366-4, PC366-5, 6331, PT331M, 657H, or 6331-20 supplied by LCY Chemical Corp.

In some embodiments, the at least one linear polypropylene is chosen from random copolymers of propylene and at least one co-monomer chosen from ethylene and butene. In some embodiments, the at least one co-monomer is present in an amount ranging from 1% to 6% by weight of the copolymer. In some embodiments, the random copolymer may have a weight average molecular weight ranging from 300,000 to 420,000. As non-limiting examples of random copolymer of propylene: Globalene® 8181, PT103, 6181, ST611, ST611K, ST611M, ST925, ST866, ST861, ST866M, ST861K, ST868M, ST868K, or 8681 supplied by LCY Chemical Corp.

In some embodiments, the at least one linear polypropylene is chosen from heterophasic (impact) copolymers of propylene comprising ethylene propylene rubber (EPR) dispersed within polypropylene homopolymer matrix. In some embodiments, the amount of ethylene is no more than 15% by weight of the impact copolymer. In some embodiments, the impact copolymer may have a weight average molecular weight ranging from 300,000 to 420,000. As non-limiting examples of heterophasic copolymer of propylene: Globalene® 7633, 7633U, 7633-3, 7533, 7433, 7433-9, 749U, or ST031 supplied by LCY Chemical Corp.

In some embodiments, the composition for preparing linear polypropylene foam comprising at least one homopolymer of propylene and at least one random copolymer of propylene. In one exemplary embodiment, the weight ratio of the at least one homopolymer of propylene to the at least one random copolymer of propylene ranges from 1:9 to 9:1, such as from 2:8 to 8:2, from 3:7 to 7:3, or from 4:6 to 6:4. In another exemplary embodiment, the weight ratio of the at least one homopolymer of propylene to the at least one random copolymer of propylene is 1:1.

In some embodiments, the composition for preparing linear polypropylene foam comprising at least one homopolymer of propylene and at least one impact copolymer of propylene. In one exemplary embodiment, the weight ratio of the at least one homopolymer of propylene to the at least one impact copolymer of propylene ranges from 1:9 to 9:1, such as from 2:8 to 8:2, from 3:7 to 7:3, or from 4:6 to 6:4. In another exemplary embodiment, the weight ratio of the at least one homopolymer of propylene to the at least one impact copolymer of propylene is 1:1.

In some embodiments, the composition for preparing linear polypropylene foam comprising at least one random copolymer of propylene and at least one impact copolymer of propylene. In one exemplary embodiment, the weight ratio of the at least one random copolymer of propylene to the at least one impact copolymer of propylene ranges from 1:9 to 9:1, such as from 2:8 to 8:2, from 3:7 to 7:3, or from 4:6 to 6:4. In another exemplary embodiment, the weight ratio of the at least one random copolymer of propylene to the at least one impact copolymer of propylene is 1:1.

In some embodiments, the composition for preparing a linear polypropylene foam may comprise one or more linear polypropylene with a MFR less than 1 g/10 min. As non-limiting examples, in some embodiments, the composition for preparing a linear polypropylene foam may comprise at least one linear polypropylene with a MFR less than 1 g/10 min and at least one linear polypropylene with a MFR larger than 1 g/10 min, wherein the amount of the at least one linear polypropylene with a MFR less than 1 g/10 min is less than the amount of the at least one linear polypropylene with a MFR greater than 1 g/10 min so that the MFR of the composition is greater than 1 g/10 min.

In some embodiments, the composition for preparing linear polypropylene foam comprising at least one homopolymer of propylene, at least one random copolymer of propylene, and at least one impact copolymer of propylene.

In some embodiments, the at least one alpha nucleating agent is chosen from organic alpha nucleating agents such as sorbitol derivatives including but not limited to 1,2,3,4-bis-dibenzylidene sorbitol (DBS), 1,2,3,4-bis-(p-methoxybenzylidene sorbitol) (DOS), 1,2,3,4-bis-(3,4-dimethylbenzylidene sorbitol) (MBDS), 1,3:2,4-di(3,4-dimethylbenzylidene) sorbitol (DMDBS), and bis(4-propylbenzylidene) propyl sorbitol; monovalent, bivalent, and trivalent 2,2'-methylene-bis-(4,6-di-tertbutylphenyl) phosphate metal salts (e.g., sodium 2,2'-methylene-bis-(4,6-di-t-butylphenylene)phosphate, known commercially as NA-11, bivalent calcium salt (NA-20), magnesium salt (NA-12), zinc salt (NA-30), and trivalent aluminum salt (NA-13)); sodium benzoate; lithium benzoate; 1,2-cyclohexanedicarboxylic acid (e.g., Hyperform® HPN-20E from Milliken & Company, which is a calcium salt of 1,2-cyclohexanedicarboxylic acid).

In some embodiments, the at least one alpha nucleating agent is chosen from inorganic alpha nucleating agents such as calcium salts, talc, silica, mica, kaolin, diatomite, and wollastonite.

In some embodiments, the at least one alpha nucleating agent is present in an amount ranging from 0.01% to 5% by weight, relative to the total weight of the composition. Further as non-limiting examples, the at least one alpha nucleating agent may be present in an amount ranging from 0.01 wt % to 4 wt %, such as from 0.05% to 4%, from 0.05% to 3%, from 0.1% to 3%, from 0.5% to 3%, or from 0.5 wt % to 2 wt % by weight, relative to the total weight of the composition.

In some embodiments, the at least one alpha nucleating agent is present in an amount ranging from 0.01 to 5 parts per hundred resin ("phr," where "hundred resin" means 100 parts of polymer(s)). Further as non-limiting examples, the at least one alpha nucleating agent may be present in an amount ranging from 0.01 to 4 phr, such as from 0.05 to 4 phr, from 0.05 to 3 phr, from 0.1 to 3 phr, from 0.5 to 3 phr, or from 0.5 to 2 phr.

In some embodiments, the at least one beta nucleating agent is chosen from: aluminum salts of 6-quinazirin sulfonic acid, phthalic acid disodium salt, isophthalic acid, terephthalic acid, N—N'-dicyclohexyl-2,6-naphthalene dicarboximide (known under the trade name NJ Star NU-100), blends of organic dibasic acid and oxide, hydroxide, or acid of a Group II metal, such as acids of Mg, Ca, St, and Ba.

In some embodiments, the at least one beta nucleating agent is chosen from (i) quinacridone type compounds, such as quinacridone, dimethylquinacridone, and dimethoxyquinacridone, (ii) quinacridonequinone type compounds, such as quinacridonequinone, a mixed crystal of 5,12-dihydro(2,3b)acridine-7,14-dione with quino(2,3b)acridine-6,7,13,14-(5H,12H)-tetrone as disclosed in EP 0 177 961 and dimethoxyquinacridonequinone; and (iii) dihydroquinacridone type compounds, such as dihydroquinacridone, di-methoxy-dihydroquinacridone, and dibenzodihydroquinacridone.

In some embodiments, the at least one beta nucleating agent is chosen from dicarboxylic acid salts of metals from group IIa of periodic table, such as pimelic acid calcium salt and suberic acid calcium salt.

In some embodiments, the at least one beta nucleating agent is present in an amount ranging from 0.01% to 2% by weight, relative to the total weight of the composition. Further as non-limiting examples, the at least one beta nucleating agent may be present in an amount ranging from 0.03% to 2%, such as from 0.03% to 1%, 0.03% to 0.5%, or 0.05% to 0.5% by weight, relative to the total weight of the composition.

In some embodiments, the at least one beta nucleating agent is present in an amount ranging from 0.01 to 2 phr. Further as non-limiting examples, the at least one beta nucleating agent may be present in an amount ranging from 0.03 to 2 phr, such as from 0.03 to 1 phr, 0.03 to 0.5 phr, or 0.05 to 0.5 phr.

In some embodiments, the weight ratio of the at least one alpha nucleating agent to the at least one beta nucleating agent ranges from 1:10 to 10:1. As non-limiting examples, the weight ratio of the at least one alpha nucleating agent to the at least one beta nucleating agent may range from 1:9 to 9:1, such as from 2:8 to 8:2, from 3:7 to 7:3, or from 4:6 to 6:4.

In some embodiments, the weight ratio of the at least one alpha nucleating agent to the at least one beta nucleating agent ranges from 1:1 to 1:10, from 1:1 to 1:5, or from 1:1 to 1:3. As non-limiting examples, the weight ratio of the at least one alpha nucleating agent to the at least one beta nucleating agent is chosen from 1:2, 1:3, 1:4, 1:5, 1:6, 1:7, 1:8, 1:9, and 1:10.

In some embodiments, the composition for preparing linear polypropylene foam may optionally further comprise one or more additives chosen from, as non-limiting examples, blowing agents, fillers (e.g., carbon nanotubes), flame retardants, anti-static agents, UV-stabilizers, cell stabilizers, thermostabilizers, anti-dripping agents, colorants, pigments, dyes, acid reducing agents, lubricants, antioxidants, antibacterial agents, impact modifiers, and processing aids. Additional additives may include filler materials such as glass fiber, calcium carbonate, and carbon black. As a non-limiting example, the one or more optional additives may be present in an amount ranging from 0.0001% to 15%, such as from 0.01% to 10% or 0.1% to 5% by weight, relative to the total weight of the composition.

In some embodiments, the composition for preparing linear polypropylene foam may optionally further comprise one or more polyolefin elastomers that are not linear polypropylene. In some embodiments, the composition for preparing linear polypropylene foam may optionally further comprise one or more thermoplastic elastomers. In some embodiments, the composition for preparing linear polypropylene foam may optionally further comprise one or more thermoplastic vulcanizates.

According to certain embodiments, suitable blowing agents include non-hydrocarbon blowing agents, organic blowing agents, chemical blowing agents, and combinations thereof. A possible combination of blowing agents is, for example, a non-hydrocarbon and a chemical blowing agent, or an organic and a chemical blowing agent, or a non-hydrocarbon, an organic, and a chemical blowing agent.

Non-hydrocarbon blowing agents may include but not limited to: carbon dioxide, nitrogen, argon, water, air, nitrous oxide, helium, and combinations thereof. In some embodiments, the non-hydrocarbon blowing agent is carbon dioxide.

Organic blowing agents may include but not limited to: aliphatic hydrocarbons having 1-9 carbon atoms, aliphatic alcohols having 1-3 carbon atoms, aliphatic ketones having 1-3 carbon atoms, aliphatic esters having 1-3 carbon atoms, aliphatic ethers having 1-4 carbon atoms, fully and partially halogenated aliphatic hydrocarbons having 1-4 carbon atoms, and combinations thereof. As non-limiting examples, aliphatic hydrocarbons include methane, ethane, propane, n-butane, isobutane, n-pentane, isopentane, cyclopentane, neopentane, and petroleum ether. Also as non-limiting examples, aliphatic alcohols include methanol, ethanol, n-propanol, and isopropanol. Further as non-limiting examples, aliphatic ketones include acetone; aliphatic esters include methyl formate; aliphatic ethers include diethyl ether and dimethyl ether; fully and partially halogenated aliphatic hydrocarbons include fluorocarbons, chlorocarbons, and chlorofluorocarbons; chlorofluorocarbons and fluorocarbons include 1,1,1,4,4,4-hexafluoro-2-butene, 1,1-dichloro-1-fluoro-ethane, 2,2-dichloro-1,1,1-trifluoroethane, 1-chloro-1,2-difluoro-ethane (HCFC-142a), 1-chloro-1,1-difluoroethane (HCFC-142b), 1,1,1,2-tetrafluoroethane, 1,1,1,3,3-pentafluoropropane, 1,1,1,3,3-pentafluorobutane, 2-chloropropane, dichlorodifluoromethane (CFC-12), 1,2-dichloro-1,1,2,2-tetrafluoroethane, 1-chloro-1,2-difluoro-ethane, trichlorotrifluoroethane and/or trichloromono-fluoromethane (CFC-11), as well as mixtures of 1-chloro-1,2-difluoroethane (HCFC-142a) and 1-chloro-1,1-difluoroethane (HCFC-142b), 1,3,3,3-tetrafluoropropene (HFO-1234ze), 1,1-difluoroethane (HFC-152a), 1,1,1,2-tetrafluorethane (HFC-134a) and chlorodifluoromethane (R22).

In some embodiments, organic blowing agents include n-butane, iso-butane, ethanol, isopropanol, dimethyl ether, and mixtures thereof.

Chemical blowing agents may include but not limited to azocarbonate-based and hydrazide-based compounds, such as azodicarbonamide, azodiisobutyronitrile, benzenesulphonyl hydrazide, 4,4'-oxy-bis-(benzenesulfonyl semicarbazide), organic acids and their derivatives, alkali metal carbonates, alkali metal bicarbonates, and mixtures thereof.

As non-limiting examples, chemical blowing agents may be chosen from organic acids and acid derivatives include oxalic acid and oxalic acid derivatives, succinic acid and succinic acid derivatives, adipic acid and adipic acid derivatives, phthalic acid and phthalic acid derivatives, and citric acid, citric acid salts, and citric acid esters, and mixtures thereof. Further as non-limiting examples, citric acid esters include those of higher alcohols, such as stearyl or lauryl citrate, and both mono- and diesters of citric acid with lower alcohols having 1-8 carbon atoms; lower alcohols from which these citric acid esters can be formed are, for example: Methanol, ethanol, propanol, isopropanol, n-butanol, iso-butanol, sec-butanol, tert-butanol, n-pentanol, n-pentan-2-ol, n-pentan-3-ol, n-hexan-3-ol and isomeric hexanols, n-heptan-1-ol, n-heptan-2-ol, n-heptan-3-ol, n-heptan-4-ol and isomeric heptanols, n-octan-1-ol, n-octan-2-ol, n-octan-3-ol, n-octan-4-ol and isomeric octanols, cyclopentanol, and cyclohexanol; diols or polyols with 1-8 carbon atoms may be used, such as ethylene glycol, glycerol, pentaerythritol or lower polyethylene glycols, for example diethylene glycol, triethylene glycol or tetraethylene glycol; the mono- or diesters with monohydric alcohols having 1-6 carbon atoms, for instance, the monoesters, such as monomethyl citrate, monoethyl citrate, monopropyl citrate, monoisopropyl citrate, mono-n-butyl citrate, and mono-tert-butyl citrate.

Further as non-limiting examples of chemical blowing agents include alkali or earth alkali metal carbonates, alkali or earth alkali metal bicarbonates, such as calcium carbonate, magnesium carbonate, calcium bicarbonate, magnesium bicarbonate, ammonium bicarbonate, sodium carbonate, potassium carbonates.

In some embodiments, the composition for preparing a linear polypropylene foam further comprises at least one blowing agent chosen from $CO_2$, n-butane, iso-butane, ethanol, isopropanol, dimethyl ether, citric acid, sodium bicarbonate, and mixtures thereof.

In some embodiments, the blowing agent is present in an amount ranging from 0% to 10%, such as 0.1% to 5% or 0.5% to 4% by weight, relative to the total weight of the composition.

Linear Polypropylene Foam

According to certain embodiments, a composition comprising at least one linear polypropylene, at least one alpha nucleating agent, and at least one beta nucleating agent as disclosed above is used to prepare a linear polypropylene foam.

Accordingly, according to certain embodiments, the present disclosure also provides a linear polypropylene foam comprising at least one linear polypropylene, at least one alpha nucleating agent, and at least one beta nucleating agent. All the embodiments described above regarding the types and the amounts of the at least one linear polypropylene, the at least one alpha nucleating agent, the at least one beta nucleating agent, and the optional one or more additive in a compositions for preparing a linear polypropylene foam also apply to the linear polypropylene foam.

For example, in some embodiments, the linear polypropylene foam comprises (i) at least 80% by weight of the at least one linear polypropylene, (ii) 0.01% to 5% by weight of the at least one alpha nucleating agent, (iii) 0.05% to 2% by weight of the at least one beta nucleating agent, and (iv) 0% to 15% by weight of one or more additives as described above.

In some embodiments, the linear polypropylene foam has a density, as measured according to ASTM D 792, of no more than about 0.15 g/cm³. For example, in some embodiments, the linear polypropylene foam has a density ranging from 0.01 g/cm³ to 0.15 g/cm³, such as from 0.05 g/cm³ to 0.15 g/cm³, from 0.06 g/cm³ to 0.15 g/cm³, from 0.05 g/cm³ to 0.10 g/cm³, or 0.05 g/cm³ to 0.7 g/cm³, or from 0.06 g/cm³ to 0.07 g/cm³.

In some embodiments, the linear polypropylene foam has an expansion ratio (i.e., the ratio of the density of unfoamed polymer composition to the density of the foam sample) of no less than about 4. For example, in some embodiments, the linear polypropylene foam has an expansion ratio ranging from 4 to 50, such as from 4 to 40, 4 to 30, 4 to 20, or 4 to 15. Further as an example, in some embodiments, the linear polypropylene foam has an expansion ratio ranging from 10 to 50, 10 to 40, 10 to 30, 10 to 20, 20 to 50, 20 to 40, 20 to 30, or 30 to 50.

In some embodiments, the linear polypropylene foam has a cell-size (i.e., the average cell diameter) ranging from 20 µm to 400 µm. For example, in some embodiments, the linear polypropylene foam has a cell-size ranging from 40 µm to 400 µm, such as from 80 µm to 400 µm, from 120 µm to 400 µm, from 150 µm to 400 µm, or from 200 µm to 400 µm. Further as non-limiting examples, in some embodiments, the linear polypropylene foam has a cell-size from 300 µm to 400 µm. In some embodiments the material has a cell-size from 20 µm to 200 µm, from 20 µm to 160 µm, from 20 µm to 100 µm, from 20 µm to 80 µm. The average cell diameter can be measured by taking cross-sectional images of the foam and used the Image Pro software to calculate the average cell diameter with the following equation:

$$D = \frac{\sum d_i n_i}{\sum n_i}$$

wherein $n_i$ is the number of cells with an area-equivalent diameter of $d_i$.

In some embodiments, the linear polypropylene foam has a MFR ranging from 1 g/10 min to 20 g/10 min.

In some embodiments, the linear polypropylene foam has a MFR ranging from 1.0 g/10 min to 5 g/10 min, such as from 1.5 g/10 min to 4.5 g/10 min, 2 g/10 min to 4 g/10 min, or 2.5 g/10 min to 3.5 g/10 min.

In some embodiments, the linear polypropylene foam has a MFR ranging from 5 g/10 min to 20 g/10 min. As non-limiting examples, the linear polypropylene foam may have a MFR ranging from 5 g/10 min to 18 g/10 min, such as from 5 g/10 min to 15 g/10 min, or 5 g/10 min to 10 g/10 min.

In some embodiments, the weight ratio of the at least one alpha nucleating agent to the at least one beta nucleating agent in the linear polypropylene foam ranges from 1:10 to 10:1. As non-limiting examples, the weight ratio of the at least one alpha nucleating agent to the at least one beta nucleating agent may range from 1:9 to 9:1, such as from 2:8 to 8:2, from 3:7 to 7:3, or from 4:6 to 6:4.

In some embodiments, the weight ratio of the at least one alpha nucleating agent to the at least one beta nucleating agent ranges from 1:1 to 1:10, from 1:1 to 1:5, or from 1:1 to 1:3. As non-limiting examples, the weight ratio of the at least one alpha nucleating agent to the at least one beta nucleating agent is chosen from 1:2, 1:3, 1:4, 1:5, 1:6, 1:7, 1:8, 1:9, and 1:10.

Continuous Foaming Process

In some embodiments, the linear polypropylene foam may be prepared by a process comprising (a) preparing a polymer composition comprising, as described above, the at least one linear polypropylene, the at least one alpha nucleating agent, the at least one beta nucleating agent, and optionally one or more additives; (b) melting the polymer composition obtained in step (a) to obtain a polymer melt; and (c) extruding the polymer melt of step (b) in an extruder in the presence of a blowing agent; and (d) cooling the extruded polymer melt and forming the linear polypropylene foam.

In some embodiments, steps (a) to (d) can be carried out in an extruder, such as a single screw extruder, a twin screw extruder, tandem extruder, or a Farrel continuous mixer. These steps may also include an additional static mixer and/or a gear pump between the extruder and the extrusion die. During said steps, the polymer resin may be heated to above the melting temperature.

In some embodiments, one or more non-hydrocarbon and/or organic blowing agents are added to the polymer melt in the mid-section of the first extruder using a high pressure pump.

As a non-limiting example, a continuous process for making the linear polypropylene foam may use a system comprising multiple heated zones such as eight heated zones as shown in FIG. 1.

In some embodiments, the process includes flowing the polymer melt through a series of heated zones; and injecting a blowing agent at one or more of the heated zones, for example, two or three heated zones.

In some embodiments, the blowing agent enters between two of the heated zones. In one embodiment, the blowing agent enters between the middle two heated zones. In one embodiment, as shown in FIG. 1, a blowing agent such as supercritical $CO_2$ is injected into the extruder between the 3rd and 4th zones.

In some embodiments, the temperature of each heated zone is from 120° C. to 220° C., such as, from 140° C. to 220° C., from 150° C. to 220° C., or from 150° C. to 200° C. In one embodiment, the heated zones are coolest where the material is fed. In one embodiment, the final heated zone is cooler than the heated zone prior to it. In another embodiment, the temperatures of the mid heated zones are higher than the temperatures of the remaining heated zones.

In some embodiments, the blowing agent is chosen from $CO_2$, butane, and $N_2$. In some embodiments, the blowing agent is $CO_2$. In some embodiments the blowing agent enters, for example, between the middle two heated zones, at a pressure ranging from 500 psi to 2000 psi, such as from 1000 psi to 2000 psi, from 500 psi to 1500 psi, from 750 psi to 1250 psi, from 750 psi to 1500 psi, or from 500 psi to 2000 psi. In some embodiments the blowing agent enters at a temperature from 160° C. to 250° C., such as from 180° C. to 250° C., from 200° C. to 250° C., from 220° C. to 250° C., from 160° C. to 225° C., from 160° C. to 200° C., 180° C. to 225° C., 180° C. to 210° C., or from 200° C. to 225° C. In some embodiments the blowing agent enters at a flow rate from 0.3 kg/hr to 1.0 kg/hr, such as from 0.5 kg/hr to 1.0 kg/hr, from 0.7 kg/hr to 1.0 kg/hr, from 0.3 kg/hr to 0.8 kg/hr, from 0.3 kg/hr to 0.6 kg/hr, from 0.3 kg/hr to 0.5 kg/hr, from 0.5 kg/hr to 0.8 kg/hr, or from 0.4 kg/hr to 0.7 kg/hr.

Batch Foaming Process

In some embodiments, the linear polypropylene foam may be prepared by a process comprising the steps of (a) preparing a polymer composition comprising, as described above, the at least one linear polypropylene, the at least one alpha nucleating agent, the at least one beta nucleating agent, and optionally one or more additives; (b) placing the polymer composition in a reactor; (c) introducing at least one blowing agent chosen from, for example, non-hydrocarbon blowing agents (e.g., $CO_2$) and organic blowing agents to the reactor, and increasing the pressure; and (d) lowering the pressure within the reactor towards ambient pressure to produce the foam.

In some embodiments, step (a) comprises further injecting or extruding the polymer composition to obtain, for example, polymer pellets.

In some embodiments, step (c) further comprises pressurizing the polymer composition with the at least one blowing agent; keeping the mixture of the at least one blowing agent and the polymer composition under the high pressure for a period of time sufficient to saturating the polymer composition with the at least one blowing agent; and discharging the pressure and cooling the reactor.

Figure 2:
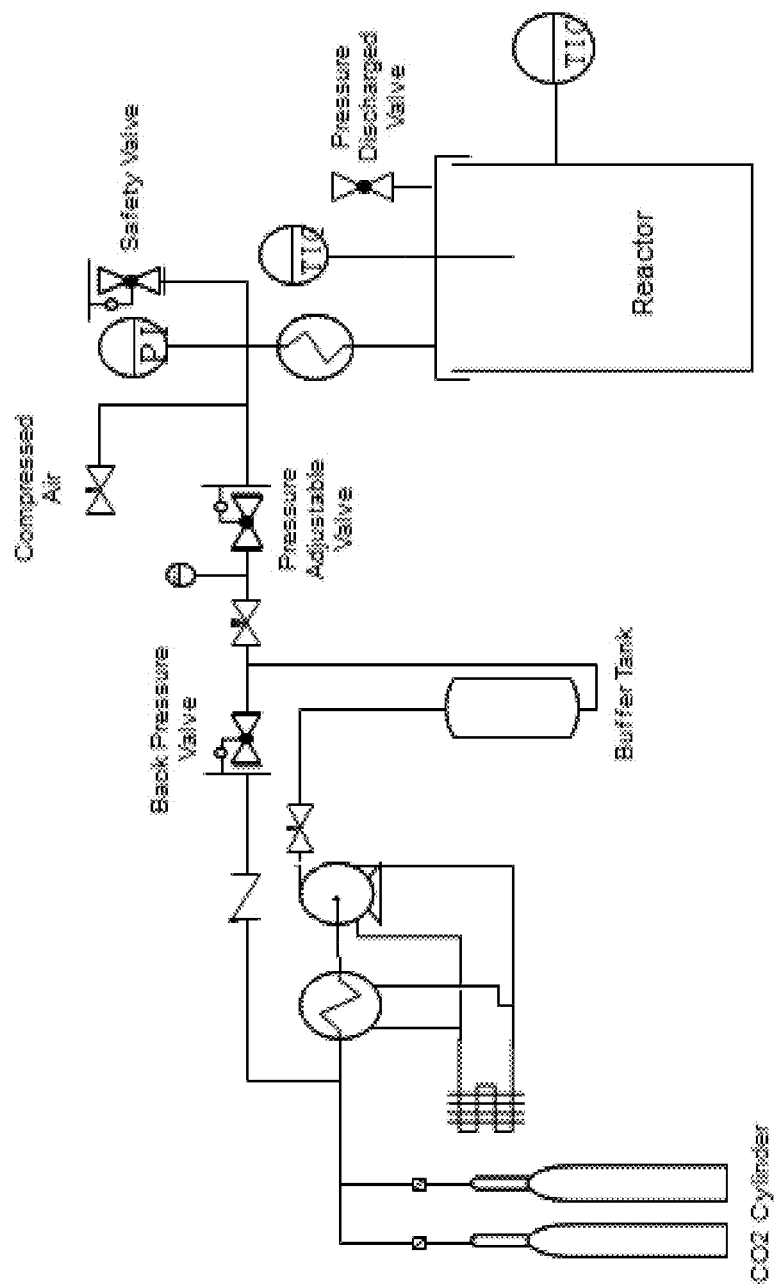
FIG. 2 shows a non-limiting, exemplary system for making a linear polypropylene foam with a batch process.

In one embodiment, the batch process for making the linear polypropylene foam may use a system as exemplified in FIG. 2.

In some embodiments, the linear polypropylene foam may be prepared by a process comprising the steps of: (a) preparing a polymer composition comprising, as described above, the at least one linear polypropylene, the at least one alpha nucleating agent, the at least one beta nucleating agent, and optionally one or more additives; (b) optionally injecting or extruding the polymer composition to obtain a polymer specimen in, e.g., pellet form; (c) loading the polymer composition/specimen into a high pressure autoclave reactor; (d) increasing the temperature within the reactor and then injecting $CO_2$ into the reactor; (e) increasing the temperature and the pressure to reach supercritical fluid (SCF) conditions of $CO_2$; (e) keeping the pressure and temperature high for a period of time, such as 30 minutes, to saturate the polymer composition/specimen with $CO_2$; (f) discharging the pressure; (g) opening the autoclave and taking out of the foam products.

In some embodiments, the autoclave reactor is pressurized from 500 psi to 3000 psi, such as, from 1000 psi to 3000 psi, from 1500 psi to 3000 psi, from 2000 psi to 3000 psi, from 500 psi to 2500 psi, from 500 psi to 2000 psi, from 500 psi to 1500 psi, from 1000 psi to 2500 psi, from 1000 psi to 2000 psi, from 1500 psi to 3000 psi, from 2000 psi to 2500 psi, or from 1750 psi to 2250 psi. In some embodiments, the temperature of the reactor increased from 120° C. to 170° C., such as from 135° C. to 165° C., from 150° C. to 160° C., from 120° C. to 160° C., from 120° C. to 150° C., from 135° C. to 160° C., from 130° C. to 160° C., or from 140° C. to 160° C. In some embodiments, the polymer composition and $CO_2$ in the heated, pressurized reactor rest for a saturation period ranging from 2 minutes to 120 minutes, for example, from 10 minutes to 120 minutes, from 20 minutes to 120 minutes, from 40 minutes to 120 minutes, from 60 minutes to 120 minutes, from 2 minutes to 60 minutes, from 2 minutes to 40 minutes, from 2 minutes to 20 minutes, from 10 minutes to 60 minutes, from 15 minutes to 45 minutes, from 20 minutes to 90 minutes, or from 30 minutes to 75 minutes.

Applications

In some embodiments, the polymeric foam of the present disclosure may be produced by sheet extrusion, board extrusion, profile extrusion, foamed sheet extrusion, of which in a second step deep drawn articles are made (e.g. for packaging, durable goods, wall decorations, food trays or food packaging). Furthermore, foam according to the present disclosure may be produced by blown films, extrusion blow molding or injection molding.

The polymeric foam according to the present disclosure may be used, as non-limiting examples, in an insulation board, e.g. for building and construction, including, but not limited to, perimeter insulation, thermal insulation of flat roofs, floor insulation, exterior wall insulation, ceiling heat insulation, steep roof insulation, interior fitting, sandwich boards, pipe insulation, frost protection layers for buildings and transportation routes (e.g. it can be applied as insulation beneath highways, streets, bridges, or airport runways).

Also as non-limiting examples, the polymeric foam of the present disclosure may be used in a decorative article, including, but not limited to, construction moldings, extruded profiles, component edge moldings, window frames, picture frames, casings, moldings, foamed stocks.

Further as non-limiting examples, the polymeric foam according to the present disclosure may be used in a packaging material for food or electronics, for medical goods or consumer goods.

Also further as non-limiting examples, the polymeric foam according to the present invention may be used in automotive parts, including, but not limited to, door side parts, door handles, dashboards, interior trim parts, air intake manifolds, battery housings, engine encapsulations, air-filter housings.

Also as non-limiting examples, the polymeric foam according to the present invention may be used as sound insulation.

EXAMPLES

Analytical Methods

Foam Density

The mass densities of foamed polypropylene (PP foams) samples $\rho_f$ were measured according to ASTM D792 involving weighing polymer foam in water using a sinker. $\rho_f$ was calculated as follows:

$$\rho_f = \frac{a}{a-b} \rho_{water}$$

wherein a is the apparent mass of sample in air, b is the apparent mass of the sample completely immersed in water, and $\rho_{water}$ is the density of water.

Scanning Electron Microscopy (SEM)

The morphologies of the obtained PP foams were studied by SEM (JEOL JSM-5600). The samples were immersed in liquid nitrogen for 30 min and then fractured. The fractured surfaces were sprayed with a layer of gold for further observation by SEM.

Differential Scanning Calorimetry (DSC)

A TA Q100 DSC was used to characterize the melting behavior of the PP foams. Samples weighing approximately 6-10 mg were used for DSC characterization. The scanning range was from 30° C. to 190° C. at a rate of 10° C./min.

Materials

WB140: HMS-PP from Borealis.

Globalene® PC366-3 ("PC366-3," MFR of 3 g/10 min): homopolymer of propylene from LCY Chemical Corp.

Globalene® 8001 ("8001," MFR of 0.3 g/10 min); random copolymer of propylene from LCY Chemical Corp.

Globalene® ST611 ("ST611," MFR of 1.8 g/10 min): a random copolymer of propylene from LCY Chemical Corp.

Globalene® ST925 ("ST925," MFR of 14 g/10 min): a random copolymer of propylene from LCY Chemical Corp.

NAB-82: calcium tetrahydrophthalate, a beta nucleating agent from Gchchem.

HPN-20E: calcium salt of 1,2-cyclohexanedicarboxylic acid, an alpha nucleating agent from Milliken & Company.

NX8000K: Bis(4-propylbenzylidene) propyl sorbitol, an alpha nucleating agent from Milliken & Company.

NX8000: 1,2,3-trideoxy-4,6:5,7-bis-O-[(4-propylphenyl) methylene]-nonitol, an alpha nucleating agent from Milliken & Company.

NU-100: N,N'-dicyclohexyl-2,6-naphtalene dicarboxamide, a beta nucleating agent from New Japan Chemical Co., Ltd.

Talc HTP-05: an alpha nucleating agent from IMI Fabi.

NA-11: 2,2'-methylene-bis-(4,6-di-t-butylphenylene) phosphate sodium salt, an alpha nucleating agent from Adeka.

EBA: LOTRYL® 17BA04, a random copolymer of ethylene and butyl acrylate, from Arkema.

POE: ENGAGE® 8150 polyolefin elastomer, an ethylene-octene copolymer, from Dow Chemical.

$CO_2$ with a purity of 99.99% was used as a blowing agent.

Example 1—Continuous Process

Before foaming, polypropylene with or without nucleating agents were first mixed in a high speed Henschel mixer for 30-60 seconds. The mixtures (10 kg each) were then put into the hopper of a co-rotating twin screw extruder (L/D: 37, KM Berstorff ZE40A) with a temperature setting of 160-200° C. and a screw rotational speed of 260-300 rpm. The extruded polymer composition was then molded through a die and then cooled in a tank with water circulation to obtain polymer strands. After water was removed, the strands were cut by a pelletizer, and the pellets were further screened with a classifier to get the final pellets for foaming process.

A continuous foaming process as shown in FIG. 1 and with the operating conditions as further described below was used to prepare linear polypropylene foams:

Barrel temperature profile: 190-200-190-170-160-160-150-150° C. (the temperature setting of the first 3 zones (maximum temperature not higher than 210° C.) was to ensure complete melting of the polymer composition before entering the 4th zone);

Main/Gear rpm: 40/20;

Gear pump rpm: 15~32;

Die temperature: 120~180° C. (see Table 1);

Supercritical $CO_2$ (SC—$CO_2$) pressure: 70~110 bar (see Table 1); and

SC—$CO_2$ injection rate: 0.25~0.36 kg/hr (SC $CO_2$ was injected between the third and fourth zones).

Figure 3:
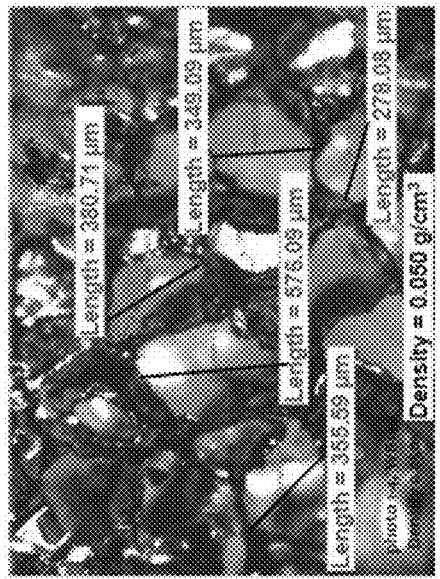
FIG. 3, A-C, show optical microscopy images of polypropylene foam samples produced according to an exemplary continuous process disclosed in Example 1.
Figure 3:
Figure 3:
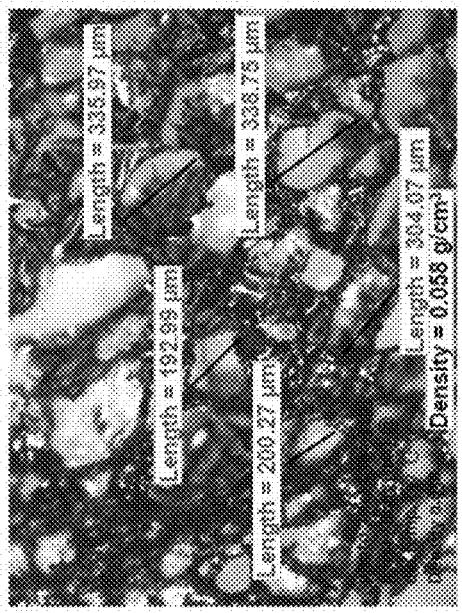

Table 1 below provides a summary of the polymer compositions, additional details regarding process conditions, and the properties (density and expansion ratio) of the resulting PP foams. The SEM images of the PP foams of comparative example 1-2, comparative example 1-3, and Example 1-2 are shown in FIGS. 3A, 3B, and 3C, respectively.

Surprisingly, foams prepared from compositions comprising both α and β nucleating agents (Examples 1-1 and 1-2) exhibit comparable or better density and expansion ratio compared to foams prepared from HMS-PP (Comparative examples 1-1 to 1-3). Foams prepared from compositions comprising only α nucleating agents (Comparative Examples 1-4 and 1-5) exhibit higher density and lower expansion ratio as compared to Examples 1-1 and 1-2.

Foam examples in Table 2 were produced using a batch process. The prepared samples from the injection molding machine were batch foamed using a high-pressure autoclave. The specimens were placed in the high pressure vessel and then $CO_2$ was injected into the vessel. After the samples were saturated under a high temperature and pressure for 30 min, an instant depressurization (<3 sec) was applied to achieve PP foaming. All samples were foamed with supercritical $CO_2$. The foaming conditions of all Examples except Example 2-4 were 155° C., 2050 psi, and 30 minutes saturation time. The foaming conditions for Example 2-4 were 140° C., 2050 psi, and 30 minutes saturation time.

Table 2 below provides a summary of the polymer compositions and the properties (density and expansion ratio) of

TABLE 1

| Sample | Polymer Composition (PP in wt %*; nucleating agents in PHR**) | Die Temp (° C.) | $S_C$-$CO_2$ pressure | $S_C$-$CO_2$ injection rate | Density (g/cm$^3$) | Expansion ratio |
|---|---|---|---|---|---|---|
| Comparative example 1-1 | 100% of WB140; 0% nucleating agent | 150 | 80 | 0.28 | 0.207 | 4.3 |
| Comparative example 1-2 | 100% of WB140; 0% nucleating agent | 140 | 80 | 0.31 | 0.091 | 9.9 |
| Comparative example 1-3 | 100% WB140; 0% nucleating agent | 125 | 80 | 0.36 | 0.050 | 18 |
| Comparative Example 1-4 | 100% of PC366-3; 0.1 phr of NAB-82 | 165 | 95 | 0.30 | 0.141 | 6.4 |
| Comparative Example 1-5 | 100% of PC366-3; 0.1 phr of NAB-82 | 150 | 95 | 0.32 | 0.114 | 7.9 |
| Example 1-1 | 90% of PC366-3; 10% of 8001; 0.1 phr of NAB-82; 0.01 phr of HPN-20E | 150 | 102 | 0.34 | 0.077 | 11.7 |
| Example 1-2 | 90% of PC366-3; 10% of 8001; 0.1 phr of NAB-82; 0.01 phr of HPN-20E | 147 | 102 | 0.34 | 0.058 | 15.5 |

*wt % is relative to the total weight of polymer (i.e., excluding additives such as nucleating agents) present in the composition.
**"phr" represents parts per hundred resin (polymer present in the composition).

Example 2—Batch Process

The polypropylene resins and nucleating agent formulations as provided in Table 2 were well-mixed in a high speed Henschel mixer for 30-60 seconds. The mixtures (10 kg each) were then put into the hopper of a co-rotating twin screw extruder (L/D: 37, KM Berstorff ZE40A) with temperature setting 160-200° C. and screw rotational speed 260-300 rpm to obtain pellet samples, which were then put into the hopper of injection molding machine (Chen Hsong Machinery, SM120V) with temperature setting at 170-220° C.

the resulting PP foams. The SEM images of the PP foams of Comparative Example 2-1, Example 2-1, Example 2-6 are shown in FIGS. 4A, 4B, and 4C respectively. As can be seen from the results, foams prepared from compositions comprising both α and β nucleating agents (Examples 2-1 to 2-12) exhibit lower density and higher expansion ratio compared to foams prepared from HMS-PP (Comparative examples 2-1 to 2-2). In addition, as shown in FIG. 4, the cell size distributions of the foams prepared from compositions comprising both α and β nucleating agents (FIGS. 4B and 4C) are more homogeneous than the cell size distribution of the foam prepared from HSM-PP (FIG. 4A).

TABLE 2

| Compositions | WB140 (wt %) | PC366-3 (wt %) | ST611 (wt %) | NAB-82 (phr) | NU-100 (phr) | NX8000K (phr) | Talc HTP-05 (phr) | NA11 (phr) | Density (g/cm$^3$) | Expansion ratio |
|---|---|---|---|---|---|---|---|---|---|---|
| Comparative example 2-1 | 100 | | | | | | | | 0.112 | 8 |
| Comparative example 2-2 | 80 | | 20 | | | | 2 | | 0.077 | 12 |
| Example 2-1 | | 90 | 10 | 0.1 | | 0.2 | | | 0.030 | 30 |
| Example 2-2 | | 70 | 30 | 0.1 | | 0.2 | | | 0.034 | 26 |
| Example 2-3 | | 50 | 50 | 0.1 | | 0.2 | | | 0.045 | 20 |

TABLE 2-continued

| Compositions | WB140 (wt %) | PC366-3 (wt %) | ST611 (wt %) | NAB-82 (phr) | NU-100 (phr) | NX8000K (phr) | Talc HTP-05 (phr) | NA11 (phr) | Density (g/cm$^3$) | Expansion ratio |
|---|---|---|---|---|---|---|---|---|---|---|
| Example 2-4 | | | 100 | 0.1 | | | 2 | | 0.054 | 17 |
| Example 2-5 | | 90 | 10 | 0.1 | | | | 0.1 | 0.041 | 22 |
| Example 2-6 | | 90 | 10 | 0.1 | | | | 0.2 | 0.022 | 41 |
| Example 2-7 | | 90 | 10 | 0.1 | | 0.1 | | | 0.019 | 47 |
| Example 2-8 | | 90 | 10 | 0.2 | | 0.05 | | | 0.026 | 35 |
| Example 2-9 | | 100 | | | 0.1 | 0.05 | | | 0.066 | 14 |
| Example 2-10 | | 100 | | | 0.1 | 0.1 | | | 0.051 | 18 |
| Example 2-11 | | 90 | 10 | 0.1 | | | | 0.05 | 0.044 | 20 |
| Example 2-12 | | 90 | 10 | 0.1 | | | | 0.1 | 0.045 | 20 |

*wt % is relative to the total weight of polymer (i.e., excluding additives such as nucleating agents) present in the composition.
**"phr" represents parts per hundred resin (polymer present in the composition).

Figure 5:
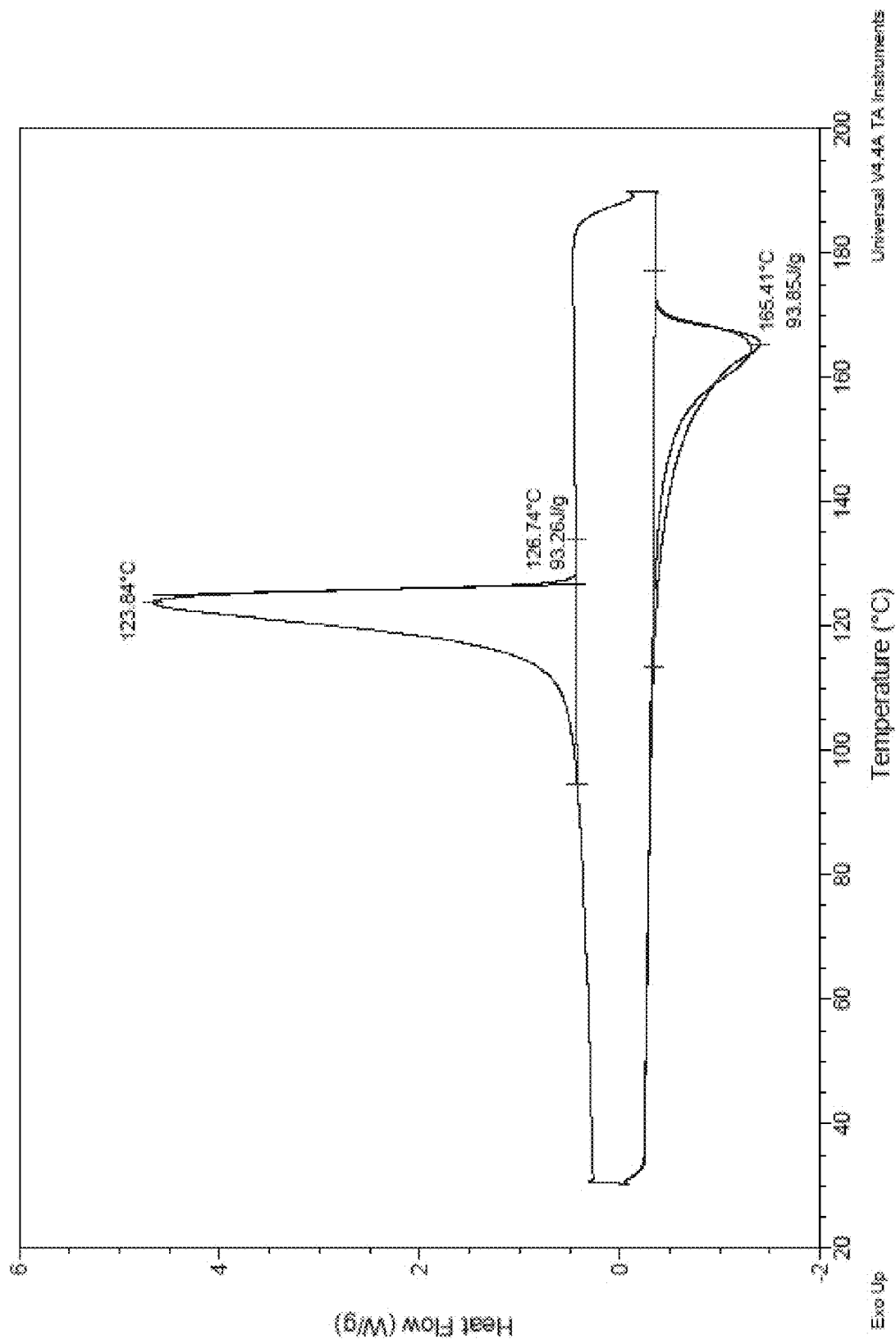
FIG. 5 is a Differential Scanning calorimetry ("DSC") trace of polypropylene foam of Example 2-1.
Figure 6:
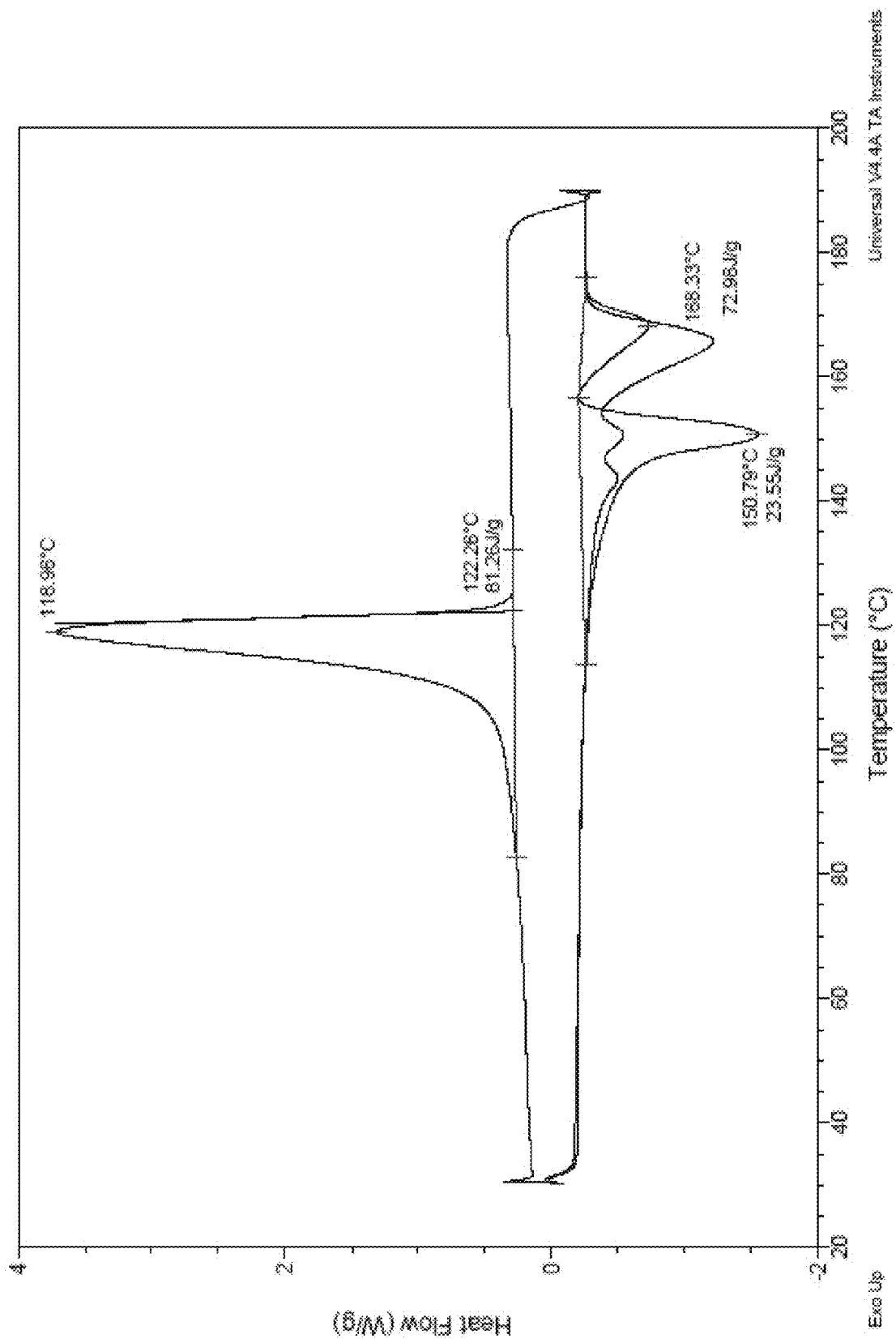
FIG. 6 is a DSC trace of polypropylene foam of Example 2-8.

The DSC diagram of Example 2-1 and Example 2-8 PP foams are shown in FIGS. 5 and 6, respectively. Interestingly, when the amount of β nucleating agent is higher or equal to the amount of alpha nucleating agent, as with Example 2-8, there are two melting peaks (α and β crystals) clearly shown in the DSC diagram. On the other hand, when the amount of beta nucleating agent is less than the amount of alpha nucleating agent, as with Example 2-1, only one melting peak (for α crystal) shows up in the DSC diagram. Nevertheless, both the cell density and expansion ratio of Example 2-1 are comparable to those of Example 2-8.

Example 3—Batch Process

Foam examples in Table 3 were produced using the batch process described in Example 2. The foaming conditions for the Comparative Example 3 were 165° C., 144 kg/cm$^2$ (about 2050 psi), and 30 minutes saturation time. The foaming conditions for Examples 3-1, 3-2, and 3-3 were 145° C., 144 kg/cm$^2$ (about 2050 psi), and 30 minutes saturation time. WB140 used in the Comparative Example 3 was not easy to be foamed with or without talc. Thus, the foaming temperature for the Comparative Example 3 was increased from 145° C. to 165° C.

NEOPOLEN® P20 and NEOPOLEN® P40 are polypropylene foams (EPP foams) from BASF.

Before testing, all foam samples were conditioned at 23° C. and 65% RH for at least 24 hours.

The density was measured according to ASTM D1622; the tensile strength and the elongation at break (%) were measured according to ISO1798:2008.

The density of the foam Examples 3-1 to 3-3 are similar to that of the EPP foams from BASF. However, the foam Examples 3-1 to 3-3 have higher tensile strength and elongation at break than the EPP foams from BASF.

Example 4—Foam Sheets

To prepare foam sheets, polymer pellets were loaded into the hopper of the first extruder after the temperature in the extruder has reached equilibrium. $CO_2$ was then fed into the first extruder through LEWA micro-pump. The gas/polymer mixture was then transferred into the second extruder. Before the polymer melt flowed out to the annular die, the barrel temperature was lowered to avoid pre-foaming. The annular polymer melt was then cooled through a cooling cylinder and cut into a sheet. After that, the sheet was drawn to a compressed cylinder sets and collected on a reel. The die temperature, gap, and sheet drawing speed were adjusted to control the sheet thickness and expansion ratio. Foaming conditions are summarized in the table below:

| | Comparative Example 4 |
|---|---|
| Temperature setting for first extruder | 165-190-200-220-220-220-220-220° C. |
| Temperature setting for second extruder | 170-185-155-153-148-145-145-150-160° C. |
| Die temperature | 150-150° C. |
| CO2 input | 0.3~0.4 kg/hr |
| Output | 26.0 kg/hr |

TABLE 3

| Compositions | Polymer | Nucleating agent (wt %) | Other additive (wt %) | Density (g/cm$^3$) | Tensile Strength (kPa) | Elongation @ break (%) |
|---|---|---|---|---|---|---|
| Comparative example 3 | WB140 | 2% Talc | | 0.717 | — | — |
| Example 3-1 | ST925 | 0.1% NAB-82 + 0.05% NX8000 | | 0.028 | 2046 | 44.84 |
| Example 3-2 | ST925 | 0.1% NAB-82 + 0.05% NX8000 | 10% POE | 0.026 | 606 | 33.23 |
| Example 3-3 | ST925 | 0.1% NAB-82 + 0.05% NX8000 | 10% EBA | 0.027 | 1159 | 31.88 |
| NEOPOLEN® P20 | | | | 0.020 | 300 | 22 |
| NEOPOLEN® P40 | | | | 0.030 | 430 | 21 |

-continued

| Examples 4-1 and 4-2 | |
|---|---|
| Temperature setting for first extruder | 165-190-200-220-220-200-200-200° C. |
| Temperature setting for second extruder | 170-165-140-138-133-130-130-145-150° C. |
| Die temperature | 145-145° C. |
| CO2 input | 0.3~0.4 kg/hr |
| Output | 31.2 kg/hr |

Before testing, all test samples were conditioned at 23° C. and 65% RH for at least 24 hours.

| Foam sheet samples | Compositions for making the foam sheets | Density (g/cm³) | Tensile strength (kPa) | Elongation @ break (%) | Tear strength (kN/m) |
|---|---|---|---|---|---|
| Test methods | | ASTM D792 | ISO 1798: 2008 | ISO 1798: 2008 | ISO 341: 2004 |
| Comparative Example 4 | WB140 | 0.261 | 5113 | 13.67 | 20.76 |
| Example 4-1 | ST925 + 0.1% (wt %) NAB-82 + 0.05% (wt %) NX8000 + 10% (wt %) EBA | 0.269 | 5165 | 41.12 | 21.75 |
| Example 4-2 | ST925 + 0.1% (wt %) NAB-82 + 0.05% (wt %) NX8000 + 5% (wt %) EBA | 0.257 | 4833 | 22.69 | 25.15 |

The density, tensile strength, and tear strength of the foam sheets Examples 4-1 and 4-2 are similar to those of the foam sheet prepared with WB140 (Comparative Example 4). Unexpectedly, the elongation at break of Example 4-1 is three times higher than that of the Comparative Example 4, i.e., the toughness of the foam sheet of Example 4-1 is better than that of the Comparative Example 4.

Example 5

The following two foam formulations were prepared and their shear viscosities at 190° C. were tested with the capillary rheometry technique.
   Example 5 (PPCFoam-T50): ST925+0.1% (phr) NAB-82+0.05% (phr) NX8000+10% (wt %) EBA
   Comparative Example 5: WB140
   Example 5 has a MFR value of 13.2 g/10 min; and Comparative Example 5 has a MFR value of 2.3 g/10 min.

As shown in the table below, under the shear rate of 100-500 1/s, the shear viscosity for Example 5 is lower compared to that of Comparative Example 5. However, under the normal shear rate range (1000~2000 1/s) of extrusion foaming, the shear viscosity for Example 5 is unexpectedly similar to that of Comparative Example 5. This indicates that, with the addition of both alpha nucleating agent and beta nucleating agent, it is possible to prepare foam materials with linear polypropylene having high MFR values.

| | NO. | Shear rate (1/S) | Shear viscosity (Pa · S) |
|---|---|---|---|
| Comparative Example 5 @190° C. | 1 | 100 | 394.98 |
| | 2 | 500 | 126.26 |
| | 3 | 1000 | 59.05 |
| | 4 | 2000 | 33.77 |

| | NO. | Shear rate (/S) | Shear viscosity (Pa · S) |
|---|---|---|---|
| Example 5 @190° C. | 1 | 100 | 287.3 |
| | 2 | 500 | 97.57 |
| | 3 | 1000 | 57.13 |
| | 4 | 2000 | 31.97 |

What is claimed is:

1. A linear polypropylene foam comprising a blowing agent, at least one linear polypropylene, at least one alpha nucleating agent, and at least one beta nucleating agent, wherein the polypropylene foam is produced by a continuous foaming process whereby extruding in the presence of the blowing agent a polymer melt comprising the at least one linear polypropylene, the at least one alpha nucleating agent, and the at least one beta nucleating agent yields said linear polypropylene foam, and a weight ratio of the at least one alpha nucleating agent to the at least one beta nucleating agent ranges from 4:1 to 9:1, wherein the foam has an average cell-size ranging from 20 to 400 μm, and wherein the average cell-size (D) is measured by taking cross-sectional images of the foam and calculating the average cell-size with the following equation:

$$D = \frac{\sum d_i n_i}{\sum n_i}$$

wherein $n_i$ is the number of cells with an area-equivalent diameter of $d_i$.

2. The linear polypropylene foam of claim 1, wherein the foam has an expansion ratio ranging from 8 to 40.

3. The linear polypropylene foam of claim 1, wherein the foam has a density of no more than about 0.15 g/cm³.

4. The linear polypropylene foam of claim 1, wherein the at least one linear polypropylene is chosen from homopolymers of propylene.

5. The linear polypropylene foam of claim 1, wherein the at least one linear polypropylene is chosen from random copolymers of propylene.

6. The linear polypropylene foam of claim 1, wherein the at least one linear polypropylene is chosen from impact copolymers of propylene.

7. The linear polypropylene foam of claim 1, wherein the at least one linear polypropylene is present in an amount of at least 80% by weight of the linear polypropylene foam.

8. The linear polypropylene foam of claim 1, wherein the at least one alpha nucleating agent is present in an amount ranging from 0.01% to 5% by weight of the foam.

9. The linear polypropylene foam of claim 1, wherein the at least one beta nucleating agent is present in an amount ranging from 0.01% to 2% by weight of the foam.

10. The linear polypropylene foam of claim 1, wherein the at least one alpha nucleating agent is chosen from 1,3:2,4-di(3,4-dimethylbenzylidene) sorbitol; bis(4-propylbenzylidene) propyl sorbitol; monovalent, bivalent, and trivalent 2,2'-methylene-bis-(4,6-di-tertbutylphenyl) phosphate metal salts; sodium benzoate; 1,2-cyclohexanedicarboxylic acid; calcium salts; and talc.

11. The linear polypropylene foam of claim 1, wherein the at least one beta nucleating agent is chosen from aluminum salts of 6-quinazirin sulfonic acid; disodium salt of phthalic acid; isophthalic acid; terephthalic acid; N—N'-dicyclohexyl 2-6-naphthalene dicarboximide; and blends of organic dibasic acid and oxide, hydroxide, or acid of a Group II metal.

12. The linear polypropylene foam of claim 1, wherein the linear polypropylene foam has a MFR ranging from 1 to 20 g/10 min.

13. The linear polypropylene foam of claim 1, wherein the linear polypropylene foam has a MFR ranging from 5 to 20 g/10 min.

14. The linear polypropylene foam of claim 1, wherein the linear polypropylene foam has a MFR ranging from 5 to 10 g/10 min.

15. The linear polypropylene foam of claim 1, wherein the linear polypropylene foam has a MFR ranging from 1 to 5 g/10 min.

16. The linear polypropylene foam of claim 1, wherein the linear polypropylene foam has a MFR ranging from 1.5 to 4.5 g/10 min.

17. The linear polypropylene foam of claim 1, wherein the linear polypropylene foam has a MFR ranging from 2 to 4 g/10 min.

18. A process of producing a linear polypropylene foam comprising a continuous foaming process, the continuous foaming process comprising:
(a) preparing a polymer composition comprising at least one linear polypropylene, at least one alpha nucleating agent, and at least one beta nucleating agent, wherein a weight ratio of the at least one alpha nucleating agent to the at least one beta nucleating agent ranges from 4:1 to 9:1;
(b) melting the polymer composition to obtain a polymer melt; and
(c) extruding the polymer melt in an extruder in the presence of at least one blowing agent; and
(d) cooling the extruded polymer melt and forming the linear polypropylene foam;
wherein the linear polypropylene foam has an average cell-size ranging from 20 to 400 μm, and wherein the average cell-size (D) is measured by taking cross-sectional images of the foam and calculating the average cell-size with the following equation:

$$D = \frac{\sum d_i n_i}{\sum n_i}$$

wherein $n_i$ is the number of cells with an area-equivalent diameter of $d_i$.

19. A linear polypropylene foam comprising at least one linear polypropylene, at least one alpha nucleating agent, and at least one beta nucleating agent, wherein the polypropylene foam is produced by a continuous foaming process or a batch foaming process, and a weight ratio of the at least one alpha nucleating agent to the at least one beta nucleating agent ranges from 4:1 to 9:1, wherein the linear polypropylene foam has an average cell-size ranging from 20 to 400 μm, wherein the average cell-size (D) is measured by taking cross-sectional images of the foam and calculating the average cell-size with the following equation:

$$D = \frac{\sum d_i n_i}{\sum n_i}$$

wherein $n_i$ is the number of cells with an area-equivalent diameter of $d_i$, and wherein the at least one alpha nucleating agent is not talc.

* * * * *